United States Patent

[11] 3,570,374

| [72] | Inventor | Michael K. Stratton<br>Peoria, Ill. |
|---|---|---|
| [21] | Appl. No. | 808,474 |
| [22] | Filed | Mar. 19, 1969 |
| [45] | Patented | Mar. 16, 1971 |
| [73] | Assignee | Caterpillar Tractor Co.<br>Peoria, Ill. |

[54] CYLINDER HEAD GASKET
6 Claims, 3 Drawing Figs.

| [52] | U.S. Cl. | 92/171 |
|---|---|---|
| [51] | Int. Cl. | F16j 11/04 |
| [50] | Field of Search | 92/169,<br>171; 277/166, 235, (Inquired); 123/193 (H) |

[56] References Cited
UNITED STATES PATENTS

| 2,939,753 | 6/1960 | Schilling et al. | 92/171 |
|---|---|---|---|
| 2,395,243 | 2/1946 | Aukers | 277/166 |
| 3,340,774 | 9/1967 | Brenneke | 92/171 |
| 3,436,085 | 4/1969 | Polk | 92/169X |
| 3,463,056 | 8/1969 | Moore et al. | 92/171 |

*Primary Examiner*—Martin P. Schwadron
*Assistant Examiner*—Allen M. Ostrager
*Attorney*—Fryer, Tjensvold, Feix, Phillips & Lempio ABSTRACT: A gasket construction comprising a carrier having a sponge rubber member about the periphery thereof and steel ferrules and rubber grommets situated at various positions in the carrier so as to connect oil and water passages from the cylinder head to the block.

Patented March 16, 1971

3,570,374

INVENTOR
MICHAEL K. STRATTON

BY Fryer, Zimmerald, Fix, Phillips & Lempio

ATTORNEYS

CYLINDER HEAD GASKET

BACKGROUND AND SUMMARY OF THE INVENTION

This invention relates generally to gasket constructions and more particularly, to a gasket for use in an engine in which an open space is present between the cylinder head and the engine block due to the fact that cylinder liners are seated on the top deck of the block and the lower deck of the head is seated on the liners.

Certain engines have cylinder liners seated directly on the top deck of the block, and the cylinder head rests directly on the cylinder liner with the water and oil passages between the block and the head normally connected by ferrules in the space between the block and the head. In many such applications, counterbores for the ferrules are made in the block to locate the ferrules for assembling the head to the block. An example of such an application has been shown in U.S. Pat. No. 2,395,243.

In such constructions, care must be taken when securing or removing the head to insure that the ferrules remain in place. In some engines, spacer plates are also used, but require a sealing gasket between the plate and the head and another sealing gasket between the plate and the block.

It is therefore an object of this invention to provide an improved and less costly engine gasket for use in the type engine described above.

It is also an object hereof to provide a means for positive location of grommets and ferrules relative to the fluid passages in the block and head, without resorting to the use of counterbores.

It is a further object hereof to provide such a gasket wherein the space between the block and head is sealed around the outer periphery thereof to prevent foreign material from getting into the space.

It is also an object hereof to provide such a carrier which may be made from metal or plastic, since it will not be exposed to the gas loads from the combustion chamber.

Other objects and advantages of the present invention will become apparent from the following description and claims as illustrated in the accompanying drawing, by way of illustration, shows a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

DETAILED DESCRIPTION OF THE DRAWING

Figure 1:
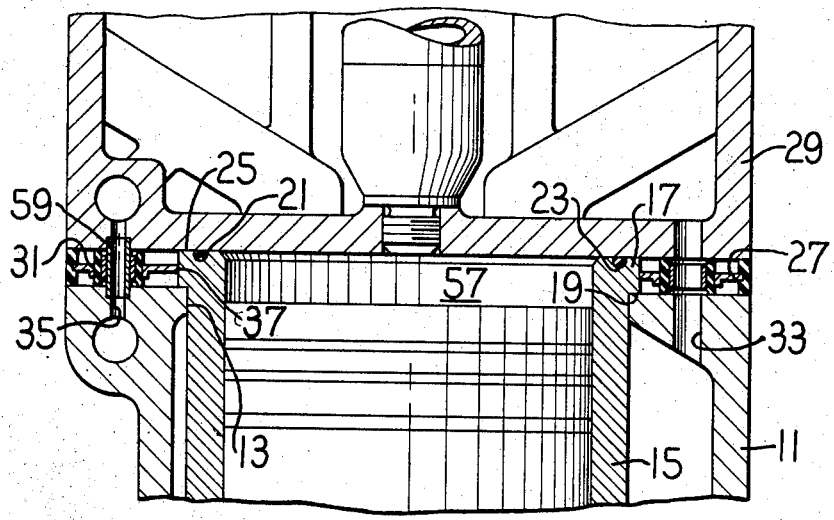
FIG. 1 is a view of one cylinder of an engine, shown in section, utilizing the instant invention.

As shown in FIG. 1, a cylinder block 11 has a bore 13 in which a cylinder liner 15 is located. The cylinder liner has a flange 17 having a lower face 19 which seats upon the top deck of the block 11. A combustion seal 21 is positioned within a groove 23 on the top face 25 of the liner 15.

Figure 2:
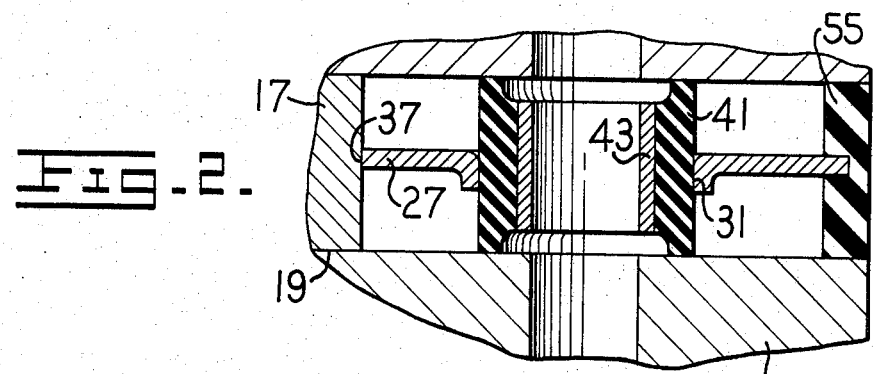
FIG. 2 is an enlargement of a portion of FIG. 1, illustrating the details of the invention with greater clarity.

Now referring to both FIGS. 1 and 2, a carrier 27 having the same general outline as the top deck of the block 11 and lower deck of a cylinder head 29, has a plurality of holes 31 which are concentric with water passages 33 and oil passages 35. A clearance hole 37 in the carrier provides for suitable positioning of the carrier about the flange 17 of the liner 15.

In order to form a continuous, sealed flow path for water and oil through passages 33 and 35, respectively, grommets 41 are pressed into the apertures 31 in the carrier, and ferrules 43 are fitted within the grommets. Thus, when the head 29 is tightened on the cylinder block, tending to draw it towards the block 11, the rubber grommets 41 become compressed so as to seal any opening remaining between the ferrule 43 and the head and cylinder block.

Figure 3:
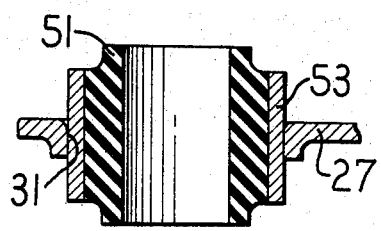
FIG. 3 is an alternate embodiment of the arrangement of parts of the instant invention.

An alternate arrangement for mounting the ferrules and grommets is shown in FIG. 3 wherein a ferrule 53 is inserted within the aperture 31 and a rubber grommet 51 is inserted within the ferrule. This allows a lower cost material to be utilized for the ferrules.

In both embodiments, the outer periphery of the carrier 27 has a sponge rubber seal 55 mounted thereon.

Thus, when the cylinder head 29 is secured to the block 11, it presses upon face 25 of the cylinder liner 15, compressing seal 21 to prevent combustion leakage from cylinder 57 to the water and oil passages. The head also compresses either the grommet 41 or 51, depending upon which embodiment is utilized, to produce a seal between the block and head and allow the passage of water from the cylinder block to the cylinder head. The seal 55 is compressed and acts as a dust seal to prevent dirt, etc., from entering between the face of the cylinder head and the cylinder block.

If desired, in either embodiment, a tube 59 may be utilized to insure more positive sealing in applications involving high-pressure oil.

Thus, the applicant has provided a new and improved cylinder head gasket embodying a carrier for precisely positioning fluid passage ferrules and means to seal the passages, together with a means for preventing dust from entering the space between the cylinder head and the cylinder block. Although only two embodiments have been illustrated, it is obvious that many modifications and changes can be made to that structure described without exceeding the scope of the following claims.

I claim:

1. In an engine, a cylinder block, a cylinder liner in the cylinder block, a flange on the cylinder liner and supporting the liner in the block by being seated on the upper deck of the block, a cylinder head seated on the flange and separated from the block by the thickness of the flange thereby defining an open space, fluid passages in the head and block, means located within said open space connecting the fluid passages in the head to those in the block, carrier means also located within said open space in which a plurality of such connecting means are fixed for alignment with a plurality of fluid passages in the head and the block, and preventing means on the carrier means whereby the carrier means is spaced from both the head and the block.

2. The engine of claim 1 wherein the preventing means on the carrier means includes means which seal the space between the head and the block about the periphery of the engine.

3. The engine of claim 1 wherein the preventing means includes the connecting means.

4. The engine of claim 1 wherein the connecting means includes a ferrule and a sealing grommet mounted in each of a plurality of apertures in the carrier means.

5. The engine of claim 1 including a combustion seal between the flange and the head which prevents combustion leakage from within the cylinder liner to the space in which the carrier is mounted.

6. The engine of claim 1 including counterbores in the head and block at selected fluid passages, and a tube seated in the counterbores and extending through the connecting means.